(12) United States Patent
Orlandi

(10) Patent No.: US 6,842,953 B2
(45) Date of Patent: Jan. 18, 2005

(54) METHOD AND DEVICE FOR PRODUCING COMPOSITE NONWOVENS BY MEANS OF HYDRODYNAMIC NEEDLING

(75) Inventor: Vittorio Orlandi, Arsago Seprio (IT)

(73) Assignees: Fleissner GmbH & Co. Maschinenfabrik, Egelsbach (DE); Orlandi SpA, Gallarate (IT)

(*) Notice: Subject to any disclaimer, the term of this patent is extended or adjusted under 35 U.S.C. 154(b) by 85 days.

(21) Appl. No.: 10/216,747

(22) Filed: Aug. 13, 2002

(65) Prior Publication Data

US 2003/0024092 A1 Feb. 6, 2003

Related U.S. Application Data

(63) Continuation-in-part of application No. PCT/EP01/00384, filed on Jan. 13, 2001.

(30) Foreign Application Priority Data

Feb. 24, 2000 (DE) .......................... 100 08 746

(51) Int. Cl.$^7$ .............................. D04H 1/46; D04H 5/02
(52) U.S. Cl. ........................................... 28/104; 28/103
(58) Field of Search ................... 28/104, 105, 106, 28/167, 103, 107, 110–114, 116, 117, 158, 166; 442/385, 409, 413, 417, 387, 393, 408, 411, 388, 402, 403; 156/62.2, 62.6, 62.8, 148, 182

(56) References Cited

U.S. PATENT DOCUMENTS

| | | | | | |
|---|---|---|---|---|---|
| 4,950,531 | A | * | 8/1990 | Radwanski et al. | 442/351 |
| 5,240,764 | A | * | 8/1993 | Haid et al. | 442/408 |
| 5,328,759 | A | * | 7/1994 | McCormack et al. | 442/402 |
| 5,413,849 | A | * | 5/1995 | Austin et al. | 442/329 |
| 5,475,903 | A | * | 12/1995 | Collins | 28/104 |
| 5,573,841 | A | * | 11/1996 | Adam et al. | 428/219 |
| 5,617,618 | A | * | 4/1997 | Fleissner | 28/103 |
| 6,022,818 | A | * | 2/2000 | Welchel et al. | 442/384 |
| 6,063,717 | A | * | 5/2000 | Ishiyama et al. | 442/387 |
| 6,177,370 | B1 | * | 1/2001 | Skoog et al. | 442/387 |
| 6,381,817 | B1 | * | 5/2002 | Moody, III | 28/104 |
| 6,460,233 | B2 | * | 10/2002 | Noelle | 28/104 |
| 6,516,502 | B1 | * | 2/2003 | Moody, III | 28/104 |
| 2003/0101556 | A1 | * | 6/2003 | Fleissner | 28/104 |

* cited by examiner

*Primary Examiner*—Amy B. Vanatta
(74) *Attorney, Agent, or Firm*—Antonelli, Terry, Stout & Krauss, LLP

(57) ABSTRACT

Method of producing a composite nonwoven for receiving and storing liquids or the like, comprising a carded nonwoven, which is treated in order to consolidate it, and a pulp layer, such as a wood pulp fiber layer, applied to the consolidated carded nonwoven and brought into secure contact with same, characterized in that the carded nonwoven is consolidated dry before being coated with the super-absorbent material, then the layer formed from the pulp fibers is applied to this pre-consolidated carded nonwoven and everything is interconnected.

13 Claims, 2 Drawing Sheets

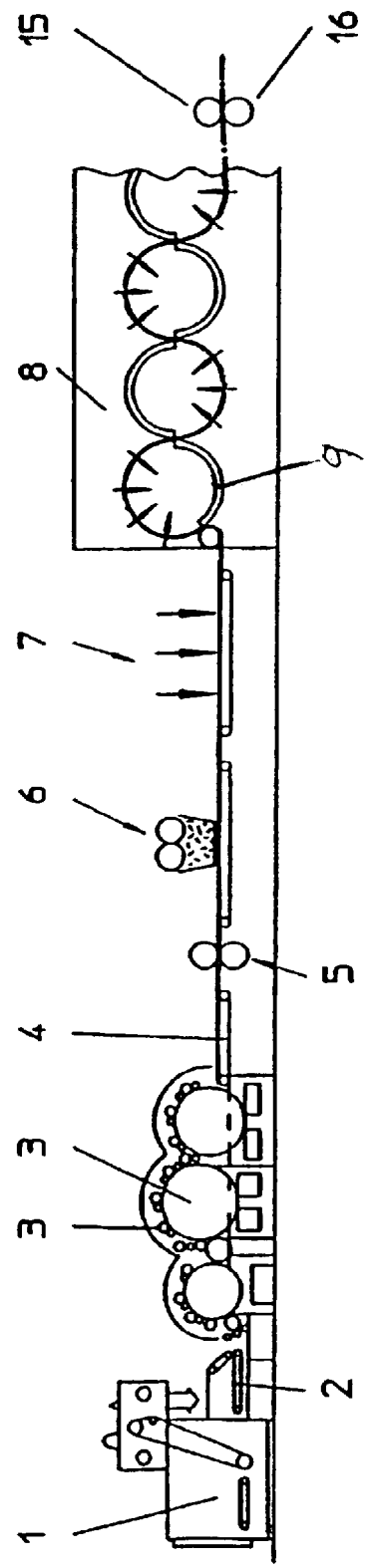
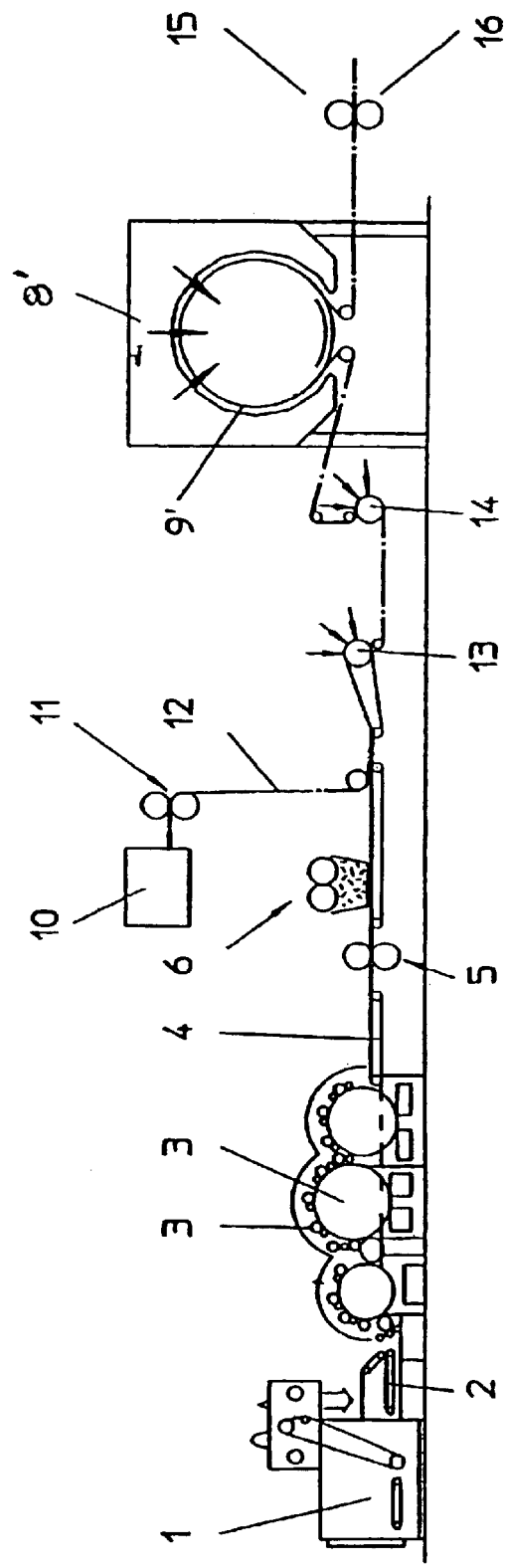

METHOD AND DEVICE FOR PRODUCING COMPOSITE NONWOVENS BY MEANS OF HYDRODYNAMIC NEEDLING

CROSS REFERENCE TO RELATED APPLICATION

This application is a Continuation-In-Part application of International Application No. PCT/EP01/00384, filed Jan. 13, 2001, designating the United States.

BACKGROUND OF THE INVENTION

From EP 0 333 209 is known a method of hydraulically interconnecting elastomeric continuous filaments and wood pulp fibers and thus consolidating the composite nonwoven. With this consolidation method there is the danger that a large number of the pulp fibers is washed out of the system, i.e. fibers are lost. Moreover it has been noted in practice that even the outer layer of such a composite nonwoven has a tendency to pill, as is described in WO 90/04066. As an improvement, it is suggested in EP 0 540 041 that the continuous filament nonwoven be treated hydraulically before the pulp fibers are applied. This is intended not only to give the nonwoven greater strength but also to improve the capacity of the nonwoven to accommodate the pulp fibers and to improve the liquid distribution properties. According to this document, the pulp fiber is then merely applied to the needled nonwoven and then, to make the connection with the nonwoven, dried or mechanically pressed into same.

Besides a nonwoven produced from continuous filaments (spunbonded fabric), said nonwoven can also be formed from staple fibers by means of a carding machine. However, the same problems apply here in the production of a composite nonwoven together with pulp fibers, namely the pulp falls and flows through the nonwoven during the necessary consolidation by means of the water needling, and this results in the high pulp loss. Taking into account the finding in EP 0 540 041, there is in practice a known method of compacting the carded nonwoven before applying the pulp layer for consolidation by means of water needling. However, this has the disadvantage that the nonwoven is wet before the pulp is applied, and this moisture has a negative effect on the method of applying the pulp layer, e.g. by means of the air-lay process. In the air-lay method, namely, a negative pressure is created below the web via which naturally a certain proportion of the fibers is led away and comes into circulation. These diverted fibers would then also be damp or wet which again hinders the uniform deposition of the fibers in the air-lay method.

SUMMARY OF THE INVENTION

The object underlying the invention is to find a method and the associated device with which these problems are eliminated.

Proceeding from a method for producing a composite nonwoven for receiving and storing liquids or the like, comprising a carded nonwoven, which is treated to consolidate it, and a pulp layer, such as a wood pulp fiber layer, applied to the consolidated carded nonwoven and brought into secure contact with same, the invention sees the solution to the set problem in the fact that, to pre-consolidate it, the carded nonwoven has air applied to it or is calendered before being coated with the super-absorbent material, then the layer of pulp fibers is applied to this thus pre-consolidated or calendered carded nonwoven and everything is interconnected. The consolidation such as calendering of the carded nonwoven before further processing improves not only the abrasion resistance of the end product but also reduces the pulp loss during the water needling in and through the nonwoven. However, care must be taken to ensure that this consolidation such as calendering is not too severe. If the consolidation is too great, the binding points are too diverse and then connection of the pulp layer to the calendered nonwoven by water needling is rendered more difficult.

Calendering of the carded web initially laid down, mostly with a weight of 10–30 g/m2 from any type of crimped staple fiber, takes place under different conditions than the usual thermobonding calendering. The nip pressure instead of 150–300 N/mm now is less than 90 N/mm, preferably around 20 N/mm, and the temperature of the calender rollers lies 5–10% below the melting temperature of the respective crimped man-made fiber used, i.e. 200–230° C. for polyester or around 140° C. for polypropylene. Calendering does not take place over the full surface, but only a contact surface of 10–30% of the calender rollers. The embossing surface of the calender rollers depends on the type of product. The used patterns of the calender rollers are optional, while mostly round or oval printing patterns, in so far as the fibers remain undamaged, the bulky touch remains unchanged and no fibers are broken. After calendering the bottom web thus treated is not only more strongly bonded and therefore offers another touch and another look than the top web that might be used, but it can also be transported more quickly so that all in all a higher production speed can be achieved. For example, the strength of a three-layer web with a total weight of 50–56 g/m2 is increased to 24–26 N due to calendering with 12–14 N (CD) according to the invention so that the tearing strength is increased by 30%. Pulp loss is reduced from 8–10% to now 3–4% of the pulp used.

For this reason, to improve the tendency to pill, the nonwoven can be calendered once more at the end of the binding process after drying, and by this means secure incorporation of all the surface fibers can be achieved and/or a pattern can also be embossed into the finished sandwich web. In the case of a nonwoven product having only one carded layer, only the roller which is adjacent to the carded layer needs to be heated.

It might be advantageous, however, to calender the surface of the pulp layer with hot rollers. This produces so-called hydrogen bridges of the cellulose fibers so that a dense paper-like surface is obtained on the side of the wood pulp fibers. Such a product can then also be used for medical purposes. For the production of surgical gowns, the nonwoven should additionally be finished to be hydrophobic.

It should be noted that in this manufacturing method the pulp layer is hydraulically connected to the nonwoven, otherwise the product could not exist in practice because of a layer formation. It is even better if an additional pre-consolidated carded fiber nonwoven is applied to the pulp layer and only then the three layers are together hydraulically needled. Then, too, final calendering is advantageous.

BRIEF DESCRIPTION OF THE DRAWINGS

An appropriate device for accomplishing the method is represented schematically in the drawing. The figures show:

FIG. 1 in side view, a continuous plant for producing a composite nonwoven with only one carded nonwoven as the carrier substrate, and FIG. 2 also in side view, the plant according to FIG. 1, supplemented by the provision of an additional cover layer of a carded fiber nonwoven before the water needling.

DETAILED DESCRIPTION OF THE PREFERRED EMBODIMENTS

Figure 3:
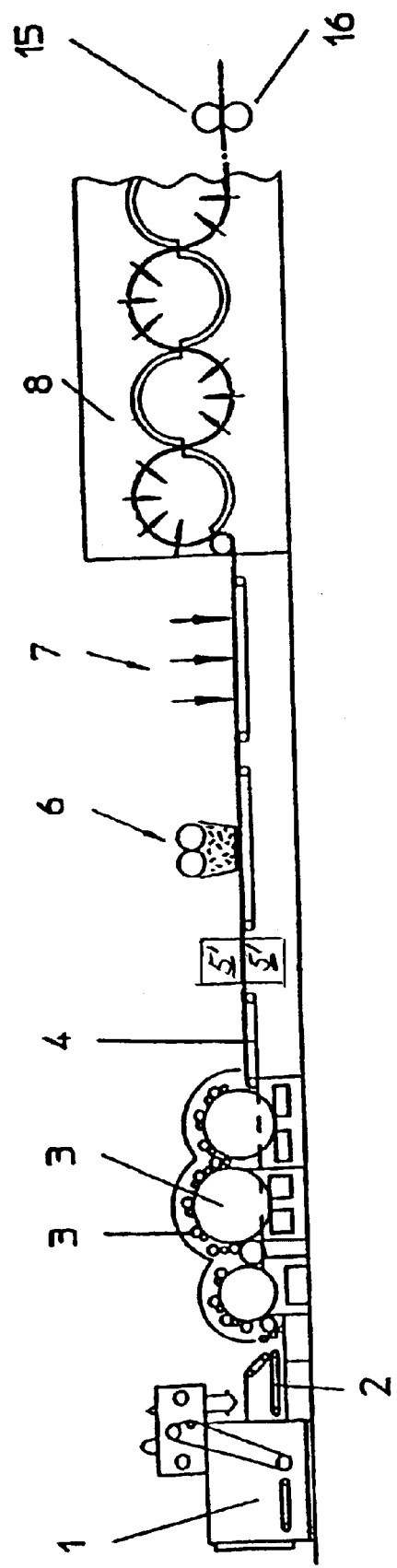
FIG. 3 is a side view of a continuous plant similar to that of FIG. 1, but using compressed air to pre-consolidate the carded non-woven.

First of all the carrier nonwoven has to be produced from the polyester fibers and/or polypropylene fibers or the like. To this end, a carding machine 1-4 serves as the web-laying device. The carding machine comprises a hopper feeder 1 with a vibrating chute 2 disposed below same which transfers the fibers spread evenly over the width to the carding machine with the carding and spiked rollers 3. The following continuous belt 4 transfers the laid carded nonwoven to a calendering device 5 which is here represented as a simple pair of rollers. The calendering device can also be replaced by a pneumatic consolidating device 5' as shown in FIG. 3. The calender mechanism 5 can also deliver according to requirements with energy and heat a possibly also finely embossed consolidated nonwoven. The consolidation effect should only be slight so that the pulp is still closely connected to the carded fiber nonwoven by means of the needling.

After this method step, the pulp fibers are applied in a known manner, e.g. by means of a device 6 according to EP 0 032 772. To join them, the two nonwoven layers are then subjected together to the hydrodynamic needling 7 which, instead of on a continuous belt as per FIG. 1, can also be carried out on a permeable drum as per FIG. 2. There follows the drying process on a perforated drum device 8, 9 with air flowing through it. In device 8, the fan is associated directly at its end with the perforated drum. Finally, further calendering 15, 16 should take place, but here with higher energy. The consolidation must be so intensive that a higher, satisfactory abrasion resistance is produced in the end product. In the example according to FIG. 1, only the roller 16 which lies on the carded nonwoven needs to be heated.

The continuous plant according to FIG. 2 corresponds to the one according to FIG. 1; only there a second, only slightly pre-consolidated carded fiber nonwoven 12 is produced by means of the schematically represented carding machine 10. The upper covering nonwoven 12 should also be pre-consolidated by means of a calender 11. After the covering nonwoven 12 has been deposited on the pulp layer laid by means of device 6 on the basic nonwoven from device 1, 5, the mentioned water needling takes place, which in this embodiment can also take place from both sides and possibly also in many stages, since the pulp layer is covered on both sides by a nonwoven. This purpose is served by needling drums 13, 14 disposed one behind the other, which are moved round in a meander shape and with each of which the jet bars indicated by the arrows are associated from above. The subsequent drying takes place here by means of a different type of air dryer, the fan being associated on the outside with the perforated drum of said dryer. Finally, the calenders 15, 16 can also be passed through, but then both the rollers 15, 16 have to be heated.

What is claimed is:

1. Method of producing a composite nonwoven for receiving and storing liquids comprising the steps of:

forming a carded nonwoven;

pre-consolidating the carded nonwoven in order to consolidate it in a dry state with only light bonding of fibers of the carded nonwoven;

applying a layer of pulp fibers to pre-consolidated carded nonwoven; and interconnecting the layer of pulp fibers and the pre-consolidated carded nonwoven.

2. Method according to claim 1, characterised in that the step of pre-consolidating is carried out by means of compressed air.

3. Method according to claim 1, characterised in that the step of pre-consolidating is produced by calendering.

4. Method according to claim 1, characterised in that the step of interconnecting the pulp fibers to the pre-consolidated carded nonwoven comprises hydrodynamic needling the layer of pulp fibers and the pre-consolidated carded nonwoven and drying the composite nonwoven.

5. Method according to claim 1, further comprising applying a third layer of carded fibers as a cover layer to the layer of pulp fibers, and the step of interconnecting the layer of pulp fibers and the pre-consolidated carded nonwoven comprises hydrodynamic needling the third layer, the layer of pulp fibers and the pre-consolidated carded nonwoven for connection purposes.

6. Method according to claim 4, further comprising calendaring the dried composite nonwoven.

7. Method according to claim 1, characterised in that the pulp fibers comprise wood pulp fibers.

8. Method according to claim 3, characterised in that the calendaring is conducted with a nip pressure less than 90 N/mm.

9. Method according to claim 8, characterised in that the calendaring is conducted with a temperature of the calendaring rollers 5-10% below a melting temperature of fibers in the carded nonwoven.

10. Method according to claim 3, characterised in that the calendaring takes place over a contact surface of 10-30% of calendaring rolls.

11. Method according to claim 1, characterised in that the steps are carried out in a continuous plant.

12. A composite nonwoven for receiving and storing liquids produced by the method of claim 1.

13. A composite nonwoven for receiving and storing liquids produced by the method of claim 5.

* * * * *